United States Patent [19]
Hightower et al.

[11] 3,734,058
[45] May 22, 1973

[54] TRANSPORTER FOR STRETCHER BORNE ANIMALS

[75] Inventors: John D. Hightower, Kailua; Martin E. Conboy, Kanfohe; Lawrence Phillips, Kailua, all of Hawaii

[73] Assignee: The United States of America as represented by the Secretary of the Navy, Washington, D.C.

[22] Filed: Sept. 1, 1971

[21] Appl. No.: 176,955

[52] U.S. Cl. .............................. 119/3, 4/177, 5/82, 119/159, 128/370
[51] Int. Cl. ..............................................A01k 61/00
[58] Field of Search.......................... 119/3, 156, 158, 119/159; 128/65, 66, 369, 370; 4/145, 177; 5/81, 82

[56] References Cited

UNITED STATES PATENTS

| | | | |
|---|---|---|---|
| 3,080,568 | 3/1963 | Burnett | 4/145 |
| 2,017,396 | 10/1935 | Brown | 4/145 |
| 568,811 | 10/1896 | Stoll | 4/177 |
| 2,542,280 | 2/1951 | Knapp | 119/159 |
| 1,501,833 | 7/1924 | Amsel | 4/177 X |

*Primary Examiner*—Louis G. Mancene
*Assistant Examiner*—J. A. Oliff
*Attorney*—Richard S. Sciascia, Ervin F. Johnston and William T. Skeer

[57] ABSTRACT

A transporter comprising a tank containing a supply of fluid, a frame mounted on the tank and extending thereabove, stretcher supporting devices on the frame, and a canopy extending over it. A fluid distribution system is disclosed connected to the tank and is arranged to discharge its contents above a stretcher supported on the frame. An open fluid receiving receptacle is disclosed as extending below the stretcher and attached to the frame.

6 Claims, 1 Drawing Figure

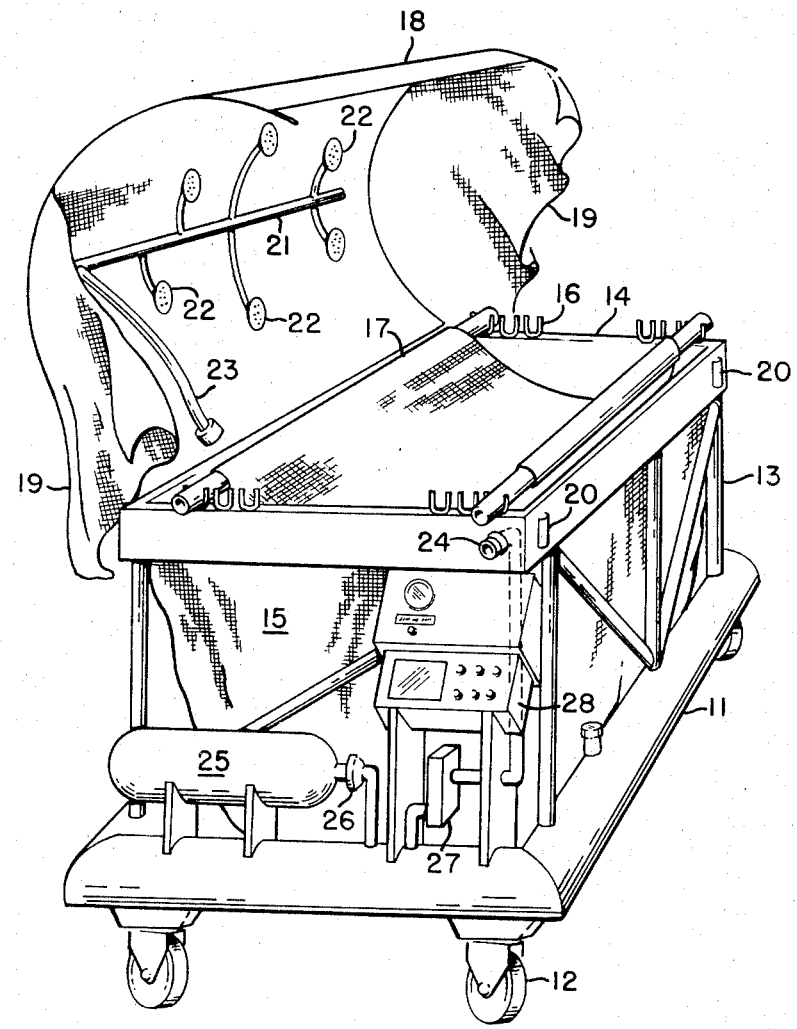
INVENTORS
JOHN D. HIGHTOWER
MARTIN E. CONBOY
LAWRENCE M. PHILLIPS
BY    WILLIAM T. SKEER
         AGENT
    ERVIN F. JOHNSTON
         ATTORNEY

TRANSPORTER FOR STRETCHER BORNE ANIMALS

STATEMENT OF GOVERNMENT INTEREST

The invention described herein may be manufactured and used by or for the Government of the United States of America for governmental purposes without the payment of any royalties thereon or therefor.

FIELD OF THE INVENTION

The invention relates generally to the transport of stretcher borne animals and, more particularly, but not by way of limitation, it relates to an improved device for the transport of stretcher borne marine animals. In greater particularity, the invention provides a device to confine a marine mammal during over land transport and maintain the animal's skin moisture without the services of a human attendant.

DESCRIPTION OF PRIOR ART

Marine mammals do not have sweat glands, as land animals do, to regulate their body temperatures. Instead marine mammals use their water environment as a cooling medium. Because these animal's skins have become adapted to an environment of water immersion, this condition of skin moisture must be maintained when the animals are removed from the water. Failure to maintain proper skin moisture results in overheating the animal and sores and other illnesses.

In recent times, the study of marine animals has become an important field in the marine biological sciences. Because of this interest, it is frequently necessary to transport animals over long distances. During such transport which most often is by surface vehicle or aircraft, attention must be given to maintaining the animal's skin moisture.

The construction of portable aquariums to provide an artificial environment for marine mammals is clearly impractical because of the size of such mammals and the volume of water which would become necessary to provide such an environment. Instead, the early methods of transport required human attendants to accompany each marine mammal and manually pour water over the animal in order to help regulate the temperature and maintain the skin in a moist condition.

This method of transport was expensive in terms of manpower and space required. Further, fatigue and inexperience of the attendant frequently resulted in the animal being wetted in a non-uniform fashion with resulting areas of skin injury. One of the more sophisticated of the early arrangements included a plastic lined wooden box in which the mammal was rested on a suitable mattress. Water which was poured or sprayed over the animal was collected by the plastic lined box and reused to help cool the animal. However, the water soon became contaminated by animal waste and its continued reuse often resulted in the delivery of the animal in an unhealthy condition.

SUMMARY OF THE INVENTION

The invention provides a stretcher borne animal with a water supply which is sprayed over the animal at predetermined intervals. A receptacle beneath the animal collects the water and stores it for later removal. A canopy extends above and over the animal thereby isolating the animal optically and acoustically as well as regulating the humidity and moisture content of the animal's skin.

In view of the foregoing, it is an object of the present invention to provide an improved transporter for stretcher borne animals.

A further object of the present invention is to provide an improved transporter for stretcher borne marine mammals.

It is another object of the present invention to provide an improved transporter with fluid applying means.

A still further object of the present invention is to provide a transporter for stretcher borne marine animals having a fluid supply therein arranged to keep the stretcher borne animal's skin moist throughout the transport period.

Other specific objects and advantages of the present invention will become obvious in reference to the following specifications and drawings.

BRIEF DESCRIPTION OF THE DRAWINGS

The FIGURE shows the perspective view of the transporter according to the invention.

DESCRIPTION OF THE PREFERRED EMBODIMENT

Referring to the FIGURE, tank 11 is shown resting on contained volume is continuous, that is, to extend through the central portion suitable support means, such as casters 12, for example. Tank 11 is formed as an open quadrilateral structure made of large diameter tubing. Aluminum, because of its weight, is preferred in this application. The tubular elements comprising tank 11 are joined such that their inner apertures form a continuous fluid tight enclosure. If additional capacity is desired, tank 11 may be made so that its contained portion of the aperture formed by the quadrilateral arrangement of the component tubes. In such instances, tank 11 is fabricated from suitable sheet stock as will be familiar to those skilled in the art.

A framework 13 extends upwardly from tank 11. Framework 13, like tank 11, may be formed of lightweight aluminum tubular elements. A top rail 14 is joined to framework 13 and forms a closed quadrilateral structure about the top thereof. If desired, the tubes forming framework 13 may be connected to tank 11 in such a fashion that their internal volume may also communicate with tank 11 and contain additional fluid.

A flexible receptacle 15 is removably supported by conventional means, not shown, from top rail 14. Flexible receptacle 15 may be made of any suitable material such as waterproof canvas, polyvinylchloride, or other suitable flexible material.

Also supported on top rail 14, are a plurality of suitable stretcher retaining means 16. Stretcher retainers 16 engage and retain the handles for stretcher 17 positioned across the top of top rail 14. As may be seen, stretcher retainers 16 are grouped into sets to support each handle of stretcher 17 in one of a plurality of positions. In the illustrated embodiment provision is made for three stretcher positions, however, more or less may be provided as experience and conditions warrant. For example, a mature animal borne on stretcher 17 may require that the stretcher be positioned in its outermost retainers 16, as shown. However, turbulent air conditions may require that the animal be constrained somewhat. In such instances, the stretcher handles may be moved to suitable inner retainers 16 thereby somewhat confining the animal. Of course, smaller animals may also require smaller stretchers and, consequently, closer spaced retainers can be used. A variety of constructions may be used for stretcher retainer 16, however, the oarlock-like devices shown have proven satisfactory.

Receptacles 20 mounted at each corner of top rail 14 provide attachment support for a canopy 18. For purposes of illustration, canopy 18 is shown partially removed from rail 14. However, when in use canopy 18 extends from one side of top rail 14 to the other side thereof. Suitable end portions 19 of canopy 18 may be removably attached thereto by means of slide fasteners, or other conventional means. Likewise, end portions 19 may be made of transparent material, thereby, permitting observation of the stretcher borne animal when in the transporter.

A suitable water conduit 21 extends along the top of canopy 18. A plurality of nozzles 22, six shown, are flexibly attached to fluid conduit 22. Nozzles 22 are flexibly mounted so as to permit positioning thereof with respect to the animal borne on stretcher 17, when canopy 18 is in place. In this manner, nozzles 22 may be adjusted to spray the particular areas of the animal as experience indicates desirable. Additionally, the animal may move a limited amount to cause other adjacent areas to be wetted.

Fluid conduit 21 is joined by a flexible hose 23 to a suitable container 24, which, in turn, communicates with fluid tank 11 so as to deliver the contents thereof to fluid conduit 21.

The delivery of the fluid contents of tank 11, via flexible hose 23, to fluid conduit 21 is made in response to a quantity of gas under pressure introduced into tank 11. Although any source of pressurized gas may be used, it is highly desirable that the transporter be self contained. The advisability of self contained operation will be apparent to those familiar with the long delays that are sometimes occasioned in air terminals and while waiting for actual transport. In the preferred embodiment, a tank 25 is used to supply the high pressure gas. Tank 25 may conveniently be the type used in supplying breathing mixture gas to underwater divers. Such gas bottles are commonly available in marine biology laboratories. Likewise, a pressure regulator 26 is connected to said gas bottle 25 as is convention in the diving arts. The gas from bottle 25 and regulator 26 is emitted to tank 11, thus holding tank 11 at a constant pressure. The periodic operation of valve 27 is controlled by a suitable electric timer 28. Like gas bottle 25 and regulator 26, valve 27 and timer 28 are conventional apparatus.

Timer 28 may be regulated to produce a period of valve actuation in accordance with the needs of the particular animal borne on stretcher 17. Since these conditions vary considerably, no specific delivery rate is given herein. It should be noted, however, that a manual actuation is also provided. Manual actuation permits the operator of the transporter of the invention to determine if the fluid delivery system is working properly and is correctly positioned before leaving the transporter unattended. This manual actuation may be provided simply by a switch, not shown, connected to the power source so as to actuate valve 27 when depressed.

Since the power requirements for timer 28 and switch 27 are very small, electrical power for the transporter of the invention is provided by internal batteries, not shown.

Although the foregoing description is sufficient to permit one versed in the art to make applicant's invention, the invention will be better understood with reference to the following description of the operation thereof.

OPERATION

Quite naturally, the operation of Applicant's device commences with the filling of tank 11 with a suitable fluid. In the case of marine animals, this fluid is most often water. Next, a flexible receptacle 15 is fitted on top rail 14 and placed in position. The stretcher borne animal is then placed in stretcher retainers 16 so as to assume the desired position. Canopy 18 is then placed over the stretcher borne animal. Canopy 18 confines the spray from nozzle 22 and helps maintain the animal's skin moist. Canopy 18 also provides visual isolation for the animal so as to prevent unnecessary disturbances by adjacent movement.

Flexible hose 23 is then connected to connector 24 and the fluid delivery system is manually positioned, as previously described, to assure uniform wetting of the animal. The operation is then checked by manual actuation as previously described. End portions 19, if not previously installed, are then attached and positioned.

When it has been determined that the device is functioning satisfactorily, the transporter is moved, as a unit, to its position in the vehicle in which transport is to be made. The transporter is then made fast by means of either brakes contained on casters 12, insertion of suitable quions, or other suitable means. In this arrangement, the stretcher borne animal may be moved considerable distances.

Although the foregoing has been described in connection with transportation of marine animals, other uses will of course suggest themselves to those familiar in the art. For example, the device of the invention may be used to keep other objects moist as they are being transported. Likewise, the invention need not be restricted to marine animals but may be used in certain applications with terrestrial life as well. Likewise, as described the invention may be used to deliver other fluid to the stretcher borne animal than those disclosed. For example, suitable fluid medication may be applied to a stretcher borne animal by the device of the invention by filling tank 11 with the desired fluid.

The foregoing description taken together with the appended claims constitute a disclosure such as to enable a person skilled in the marine biology and engineering arts and having the benefit of the teachings contained therein to make and use the invention. Further, the structure herein described meets the objects of the invention, and generally constitutes a meritorious advance in the art unobvious to such a skilled worker not having the benefit of said teachings.

Obviously, many modifications and variations of the present invention are possible in the light of the above teachings, and, it is therefore understood that within the scope of the disclosed inventive concept, the invention may be practiced otherwise than specifically described.

What is claimed is:

1. A transporter for stretcher borne animals comprising in combination:
   tank means formed of large diameter tubing joined to form a closed polygonal base for containing a supply of fluid therein;
   frame means attached to said tank means and extending upwardly therefrom configured for supporting loads placed thereon;
   a plurality of stretcher retainers attached atop said frame means and suitably shaped for engaging the handles of the animal bearing stretcher and disposed along the frame means with respect to each other to hold the animal bearing stretcher in one of a plurality of positions; and
   distribution means connected to said tank means and positioned for delivering the fluid contents thereof to a predetermined area above said frame means to apply said fluid contents to the stretcher borne animal.

2. A transporter according to claim 1 in which said tank means includes a plurality of tubular members joined together in a suitable closed quadrilateral configuration with their hollow centers providing the fluid containing volumn therefor.

3. A transporter according to claim 1 in which said stretcher retainers are dosposed in a plurality of opposed pairs and are spaced apart in a manner to support the engaged stretcher in a predetermined configuration for altering the amount of movement constraint afforded the stretcher borne animal.

4. A transporter according to claim 1 further comprising:
   a fluid-tight receptacle removably secured to said frame means and shaped to provide a fluid collecting vessel extending beneath the stretcher borne animal for collecting fluid delivered from said distribution means after it has passed over the stretcher borne animal.

5. A transporter according to claim 1 in which said fluid distribution means includes a source of pressurized gas, valve means connected between said source of gas and said tank means for admitting predetermined amounts of gas therein at timed intervals, and fluid conduit means connected to said tank for delivery of said fluid therfrom in response to the admission of said amounts of gas.

6. A transporter according to claim 5 further comprising in combination:
   canopy means connected to the aforesaid frame means and shaped to extend thereabove and over the stretcher borne animal thereby closing the upper portion thereof for providing isolation and humidity control therefor; and
   nozzle means supported by said canopy and joined to said fluid conduit means for dispensing the fluid delivered thereby to said predetermined area in relation to said stretcher borne animal to supply the fluid contents to the stretcher borne animal.

* * * * *